United States Patent [19]
Rebours

[11] 3,810,349

[45] May 14, 1974

[54] APPARATUS FOR PUTTING A GAS IN CONTACT WITH A LIQUID

[75] Inventor: Albert Rebours, Ghatou, France

[73] Assignee: Prat Daniel Poelman, Courbevoie, France

[22] Filed: Apr. 12, 1971

[21] Appl. No.: 133,097

[30] Foreign Application Priority Data
Apr. 24, 1970  France .......................... 70.14993
Oct. 23, 1970  France .......................... 70.38292

[52] U.S. Cl................ 55/248, 55/239, 261/79 A, 261/119
[51] Int. Cl............................................ B01d 47/02
[58] Field of Search................ 55/92, 95, 235-239, 55/248; 261/79 A, 119

[56] References Cited
UNITED STATES PATENTS
| | | | |
|---|---|---|---|
| 3,264,805 | 8/1966 | Tyler.................................. | 55/238 |
| 2,473,672 | 6/1949 | Ziliotto........................ | 261/79 A X |
| 2,373,330 | 4/1945 | Nutting.......................... | 261/119 X |
| 2,491,645 | 12/1949 | Clark et al. ................. | 261/119 R X |
| 1,073,622 | 9/1913 | Murray et al. ........................ | 55/95 |
| 3,514,924 | 6/1970 | Flebu........................... | 261/79 A X |
| 816,371 | 3/1906 | Platz................................. | 261/119 R |

FOREIGN PATENTS OR APPLICATIONS
1,107,647  5/1961  Germany.......................... 55/237

Primary Examiner—Frank W. Lutter
Assistant Examiner—William Cuchlinski, Jr.
Attorney, Agent, or Firm—Young & Thompson

[57] ABSTRACT

An apparatus for putting a gas into contact with a liquid, especially for separating solid or liquid particles in suspension in said gas or for eliminating certain gaseous constituents, said apparatus comprising a space in the form of a diffuser adapted to effect intimate mixing of the gas and liquid by means of the formation of a turbulent and dense suspension of drops forming a kind of semi-stationary fluidized bed. The gas and liquid pass together into the bottom of the diffuser which has the form of a divergent conduit in which is created a closed circulation of liquid effecting a continuous renewal of the bed, the impurities of the gas being treated during this circulation by physical collection with or without chemical reaction, followed by a centrifugal action which separates the gas from the drops of liquid, the liquid thus recovered being wholly or partly re-cycled.

2 Claims, 1 Drawing Figure

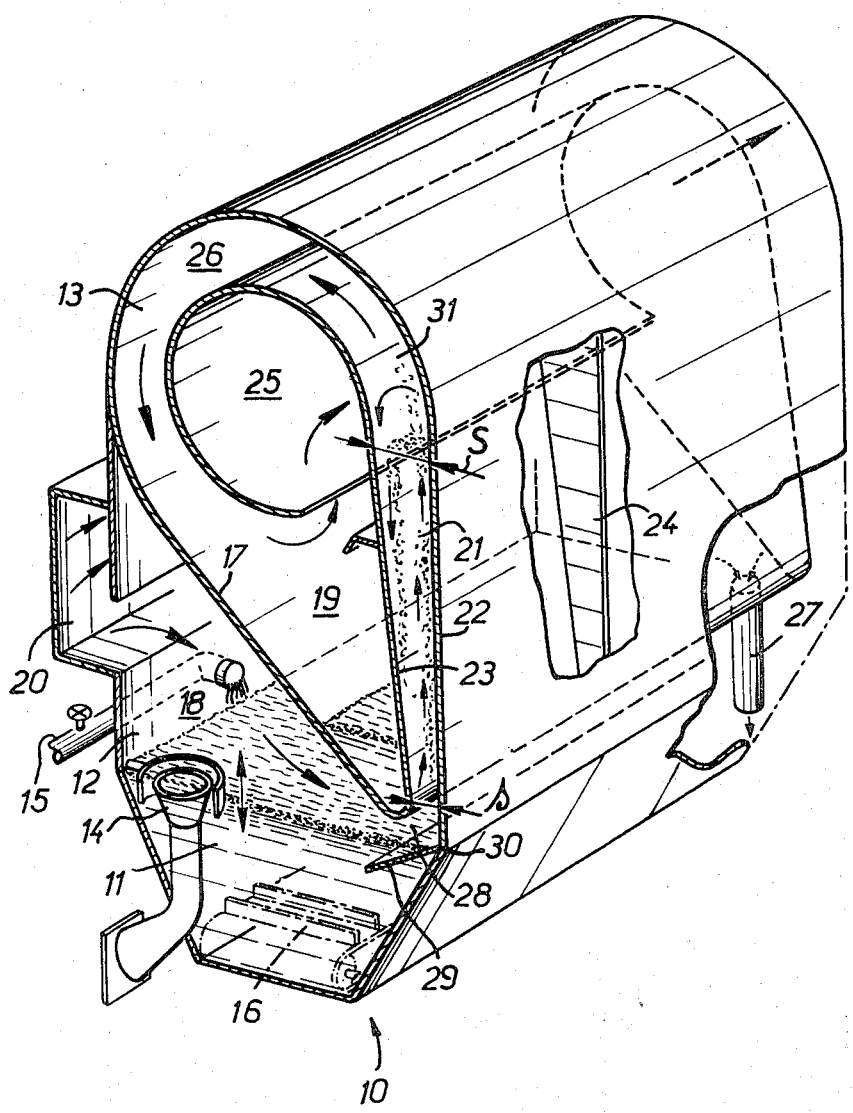

APPARATUS FOR PUTTING A GAS IN CONTACT WITH A LIQUID

The present invention relates to an apparatus for the treatment of a gas with a liquid, of the kind comprising, following the technique of French Pat. No. 1,189,410, a space in the form of a diffuser adapted to produce an intimate stirring of the gas and the liquid by means of the formation of a turbulent and dense suspension of drops constituting a kind of semi-stationary bed similar to a fluidized bed.

In an apparatus of this kind the gases and the liquid pass at the same time into the bottom of the mixing diffuser in the form of a divergent conduit, and there is produced in the interior of this conduit a kind of closed circulation of the liquid assisting a continuous renewal of the bed, the impurities of the gas being treated along this circulation by physical collection with or without chemical reaction. At the outlet of the bed, the flow is subjected to a centrifuging action which ensures the separation of the gas on the one hand and of the drops of liquid carried away on the other; the liquid thus recovered may be wholly or partly re-cycled.

The apparatus developed up to the present time for carrying this technique into effect take the form of a vertical tower, the height of which increases with increasing rates of flow.

The present invention has for its object a treatment apparatus in which the entension of the apparatus as a function of the flow rate of gas to be treated is effected, not in height but horizontally.

According to the invention, an apparatus for bringing a gas into contact with a liquid, in particular for separating the solid or liquid particles in suspension in this gas, or for eliminating certain gaseous constituents, comprising, from the bottom to the top, a bowl of liquid, an intermediate portion in communication with the surface of this bowl and forming a kind of admission for gas, an upper chamber separated from the said intermediate portion by an inclined partition constituting a recovery zone for the liquid and an evacuation zone for the gases treated, and also a zone for putting the liquid into contact with the gases, is characterized in that this contact zone comprises a mixing compartment with a rectangular section between two longitudinal substantially-flat walls which diverge towards the top, the gas admitted at the bottom of the said compartment carrying with it a liquid dispersed in small drops under conditions tending to form a zone of semi-stationary turbulent suspension in the interior of the said compartment. By "substantially flat" walls there is meant walls which may be strictly flat or alternatively may have a general form close to a flat form, for example incurved with a large radius, or again they may have slight projections or recesses, etc.

Experience has shown that apparatus having a semi-stationary liquid-flow bed in a cylindrical diffuser create in the centre of this diffuser a zone of lower density of suspension, whereas the above-mentioned structure with a rectangular diffuser of flattened form also enables this zone of lower density of suspension to be eliminated, thereby increasing the effectiveness of the treatment.

The present invention has also for its object a method of utilization of an apparatus with a liquid-flow bed comprising a rectangular diffuser of flattened form making it possible to obtain under optimum conditions in an apparatus of this kind, liquid-flow suspension in an intermediate portion of the diffuser between two staged sections of this latter.

The lower section corresponds to a speed of passage of the gases, depending on the nature of the gases and of the washing liquid, of the order of 20 to 26 m/sec. The upper section of the liquid-flow bed corresponds to a rate of speed, also a function of the nature of the gases and of the washing liquid, of the order of 7 to 12 m/sec.

To this end, the method is characterized in that, in order to obtain the condition of semi-stationary turbulent suspension, the inlet section of the gases into the diffuser and the flow-rate of the gases will be determined in such manner that the speed of flow is greater than 20 or 26 m/sec. as defined above. The outlet section of the diffuser will be determined in such manner that for the same flow-rate, the speed of the gases is less than 7 or 12 m/sec., defining the formation of the semi-stationary suspension bed.

This arrangement makes it possible to obtain, under particularly favourable conditions of stability, a condition of equilibrium between the entrainment action of the gas and the force of gravity, for the drops which are carried by the gas into the diffuser and which are subjected in the diffuser to a speed which decreases in the direction of flow. This results in an excellent effectiveness of treatment.

It will be noted that, by virtue of the dynamic laws of suspension, the drops are subjected to a lateral pressure from the zone close to the outer wall towards the internal wall of the diffuser, that is to say from the zone of highest speed towards the zone of lowest speed. The drops, in which the vertical component of the movement becomes practically nil, are therefore precipitated on to this wall and they form a liquid layer which falls down into the diffuser along this wall. When this downward-moving liquid film reaches the zones in which the rising speed of the gases is sufficiently great, it is again converted to spray and carried away by the gases towards the top of the diffuser. There is thus created a re-cycling flow of liquid which is the basis of the formation of the zone of very dense suspension and which constitutes a contact zone of maximum effectiveness.

According to another characteristic feature of the invention, the quantity of liquid carried away by the flow of gas inside the diffuser is made adjustable by variation of the level of liquid in the above-mentioned bowl of liquid.

One form of embodiment of the invention is described below by way of example, reference being made to the accompanying drawing, the single FIGURE of which is a diagrammatic view in perspective, with parts broken away, of an apparatus in accordance with the invention.

In the form of construction shown, this apparatus is adapted to put a gas into contact with a liquid, for example for de-dusting gases, for the elimination of liquid fogs such as paint fogs, or for the purification of a gas charged with gaseous pollution and comprises a body 10 elongated horizontally.

The body 10 is composed of a lower portion 11, an intermediate portion 12 and an upper portion 13.

The lower portion 11 constitutes a bowl which extends along the length of the body 10 and which receives the treatment liquid. This bowl 11 comprises a constant level device 14 of any appropriate type. According to the invention, the device 14 is such that it enables the constant valus of the level in the bowl 11 to be regulated at will in such manner that the quantity of liquid carried away by a gaseous flow (shown diagrammatically by the arrows on the drawing and described in more detail later) can be adjusted.

The bowl 11 can receive a supply of liquid 15 which is either continuous or intermittent.

There is shown at 16 a device placed in the bottom of the bowl for dredging the particles decanted when the apparatus is designed for the separation of dust. The intermediate portion 12 comprises an inclined partition 17 which extends along the length of the body and which defines below it an admission space for the gas 18, and above it a return space 19 for the liquid. There is shown at 20 a gas-supply distributor arranged on one of the sides of the body at the level of the portion 12, and at 21 a mixing compartment arranged on the opposite side, this mixing compartment 21 extending over the whole length of the body 10.

The mixing compartment 21 forms a diffuser and is delimited between two flat longitudinal walls which diverge towards the top: An outer vertical wall 22 and an inclined internal wall or deflector 23. The walls 22 and 23 can with advantage be strictly flat, as shown, or they may have a general form close to a flat form, for example incurved with a large radius, or alternatively they may have portions slightly in relief and recessed, etc.

More particularly, for obtaining a semi-stationary turbulent suspension condition in the diffuser 21, the input sections $s$ and the output sections S of the diffuser 21 and the flow-rate of the gas are determined in such manner that the speed of flow of the gases is located above 20 to 26 m/sec. at the inlet and below from 7 to 12 m/sec. at the outlet of the diffuser 21. An arrangement of this kind provides a particularly effective treatment.

Transverse vertical partitions 24 are advantageously provided along the diffuser 21 in order to improve the conditions of distribution of the flow. The diffuser 21 extended in a cylindrical form 20, thus forming a cyclone separator with a horizontal axis around the passage 25 serving as an evacuation tube for the treated gases. With regard to the liquid separated at 19, this may be wholly or partly evacuated to the exterior of the apparatus or sent back into the bowl 11 by means of the conduit 27 which dips below the liquid level of the bowl 11.

The operation of the apparatus is as follows. The treated gas is admitted through the supply distributor 20 into the space 18 (see the arrows) in which it is changed in direction and brought up to speed by the inclined partition 17. This latter forms a kind of wedge with the level of the liquid of the bowl 11 in order to channel the gases to be treated towards the lower intake 28 of the mixing compartment 21.

It will be noted that the inlet 28 can be provided with a guiding plate 29, the incidence of which is preferably adjustable, for example by articulation along the horizontal axis 30.

At the inlet 28, the gases cause an agitation of the surface of the liquid, carrying away a certain quantity of this liquid in the form of drops obtained by blowing the tops of the ripples towards the inlet 28 of the diffuser 21. Due to the increasing section towards the top of the diffuser 21, the speed decreases and thus creates the conditions necessary for the formation of a semi-stationary bed of large drops, and this takes place under particularly stable conditions by virtue of the choice referred to above of the sections $s$ and S at the inlet and outlet of the diffuser 21.

These drops are precipitated towards the internal wall of the diffuser and move downwards along this latter to a lower zone at which the speed of the gases is sufficiently high to stop this downward movement of the liquid and to carry it away again upwards by blowing into spray. There is thus created in the interior of the diffuser 21 a circulation of liquid in closed circuit which contributes to the increase in the density of the suspension and to its efficacy.

It will be noted that the asymmetry introduced into the compartment 21 by the verticality of the partition 22 reinforces this gyratory movement of the liquid.

The gas and the fine droplets which have not been stabilized in the diffuser 21 by reason of their great fineness are carried away and separated in the cyclone 26, the gases being directed towards the outlet collector 25 while the liquid streaming over the wall 17 is directed towards the evacuation conduit 27.

What I claim is:

1. Gas-liquid contact apparatus comprising a closed housing having a lower portion providing a container for liquid, means for supplying liquid to said container portion, means for introducing gas to be contacted with liquid above and in contact with the surface of liquid in said container portion, a pair of upright planar upwardly diverging walls defining between them a narrow vertical mixing compartment in said housing and having a lower inlet end disposed above said surface of liquid, one of said walls being a side wall of said housing and the other of said walls being spaced from said one wall within said housing, and means for conveying gas from the upper end of said compartment, said walls cooperating with gas rising in said compartment to create in said compartment a substantially stationary but internally circulating vertical contact zone for prolonging contact between the liquid droplets and gas, said compartment having at least one transverse vertical partition therein extending between said walls and dividing said compartment into a plurality of sections.

2. Apparatus as claimed in claim 1, there being a plurality of said partitions horizontally spaced apart in said compartment.

* * * * *